July 10, 1956
E. H. WOODHULL ET AL
2,754,424
NON-DISPERSION ANALYZERS
Filed Jan. 30, 1953
4 Sheets-Sheet 1
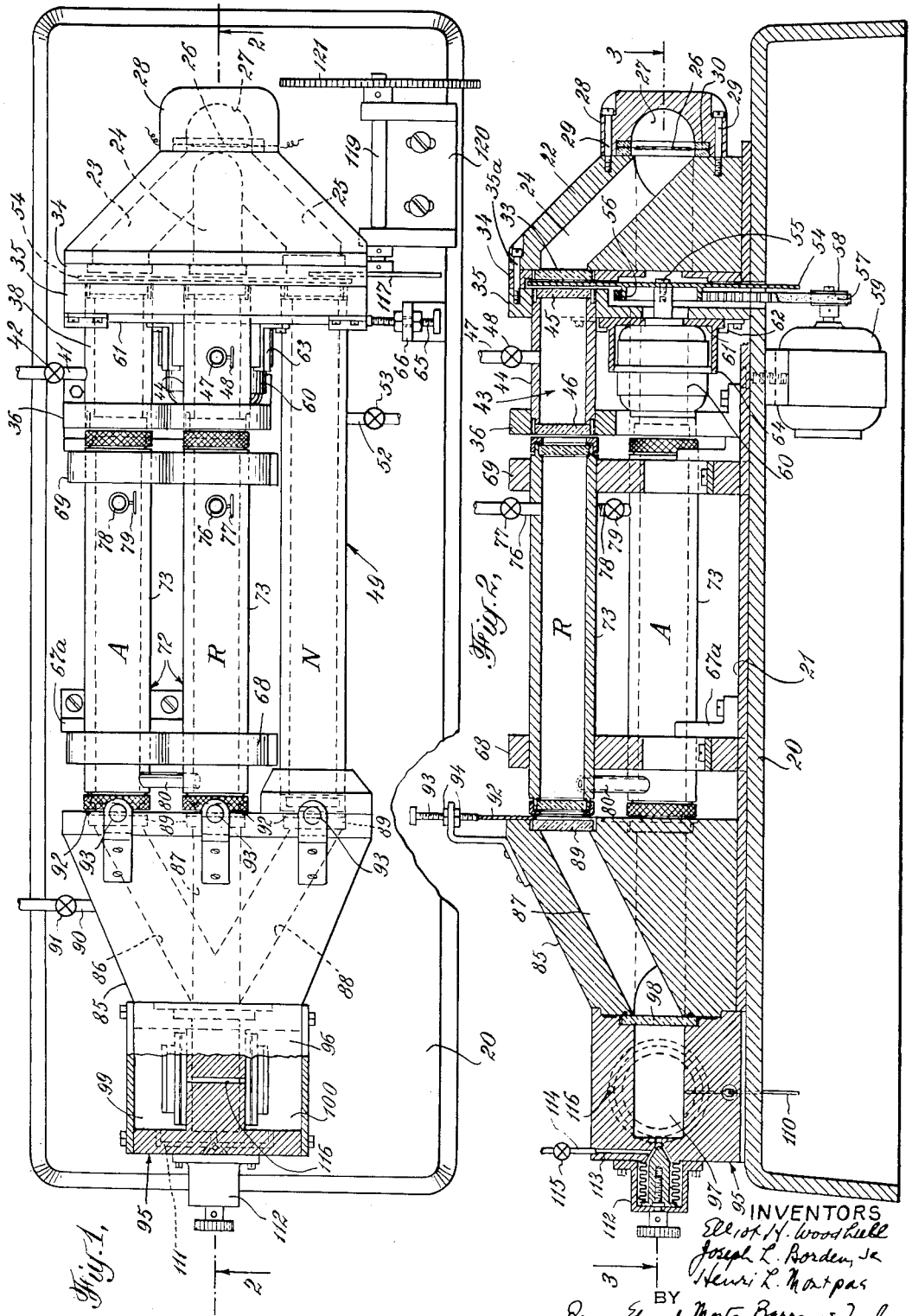
INVENTORS
Elliot H. Woodhull
Joseph L. Borden, Jr.
Henri L. Montpas
BY
Pennie Edmonds Morton Barrows & Taylor
ATTORNEYS

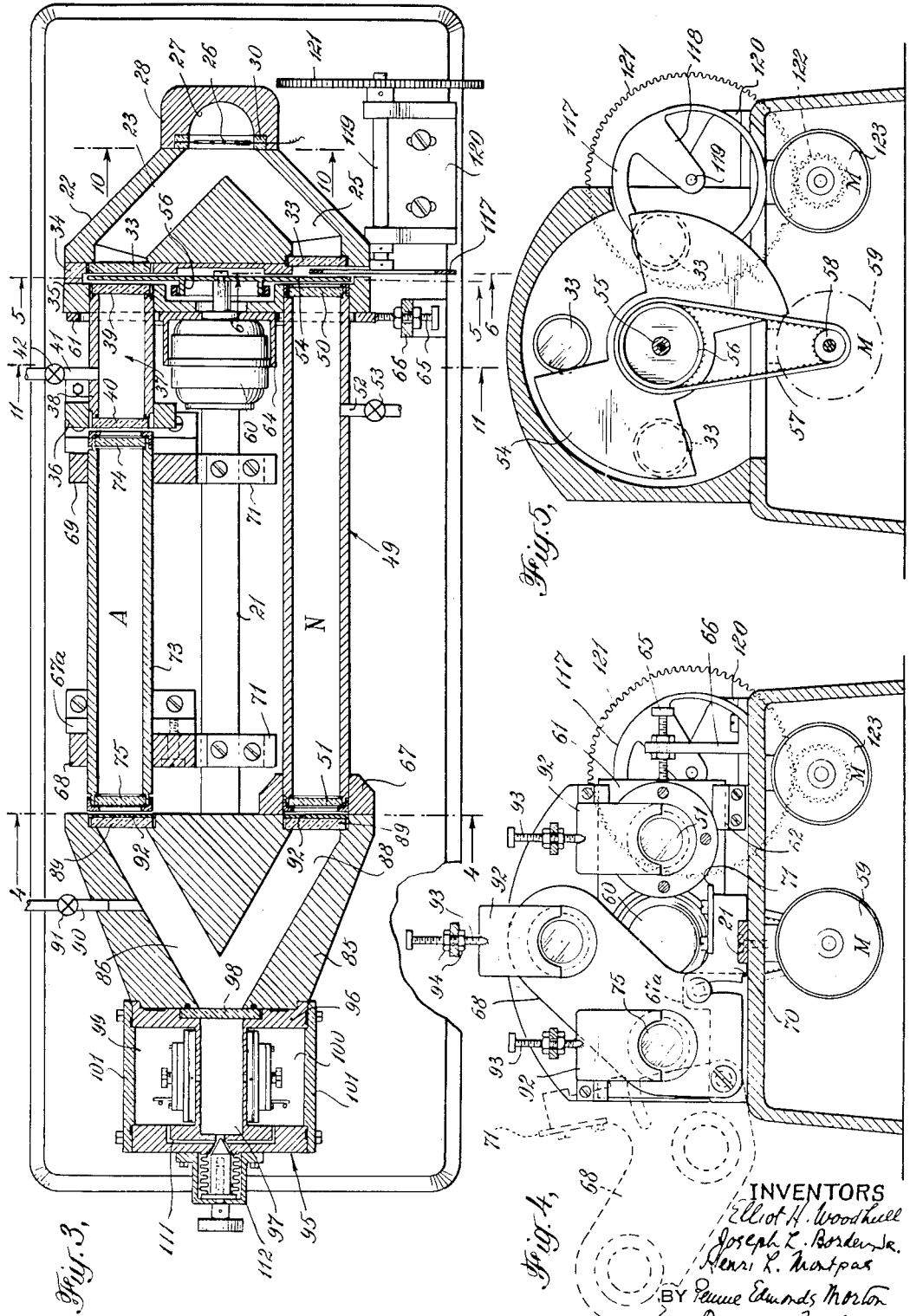

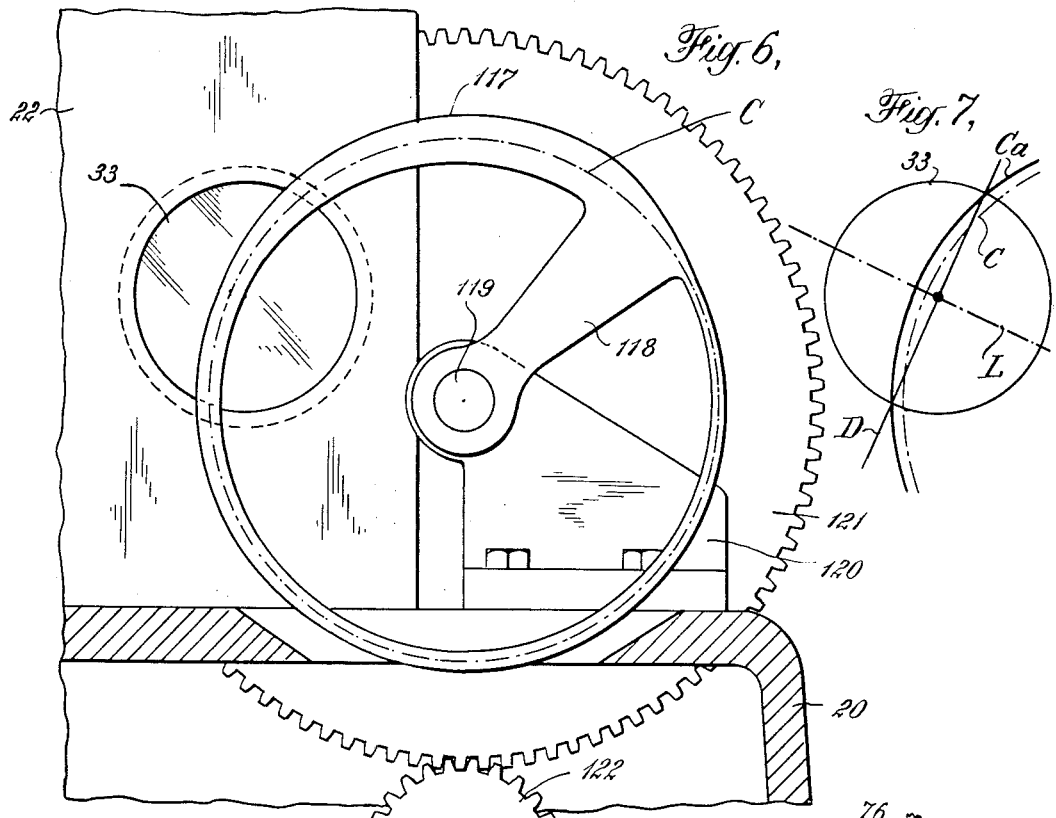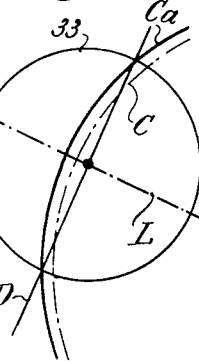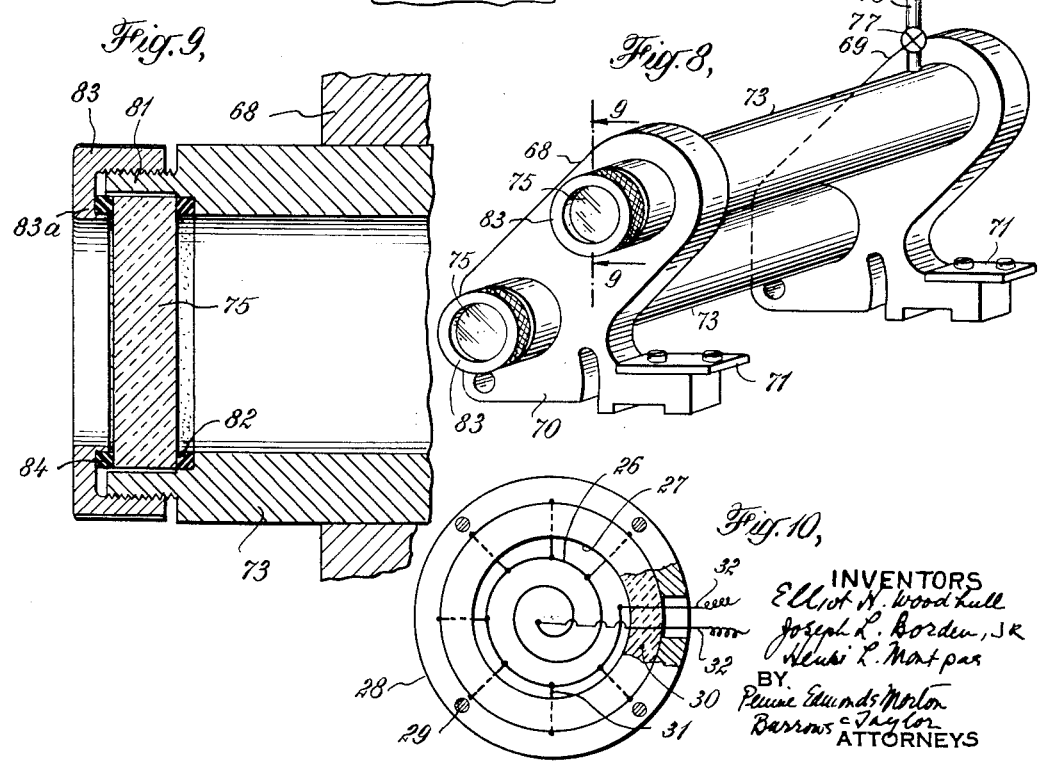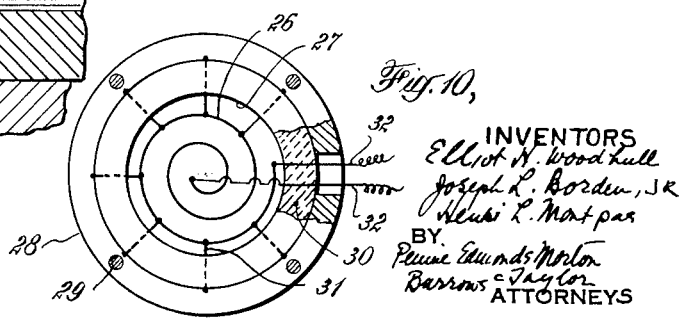

July 10, 1956 E. H. WOODHULL ET AL 2,754,424
NON-DISPERSION ANALYZERS
Filed Jan. 30, 1953 4 Sheets-Sheet 4
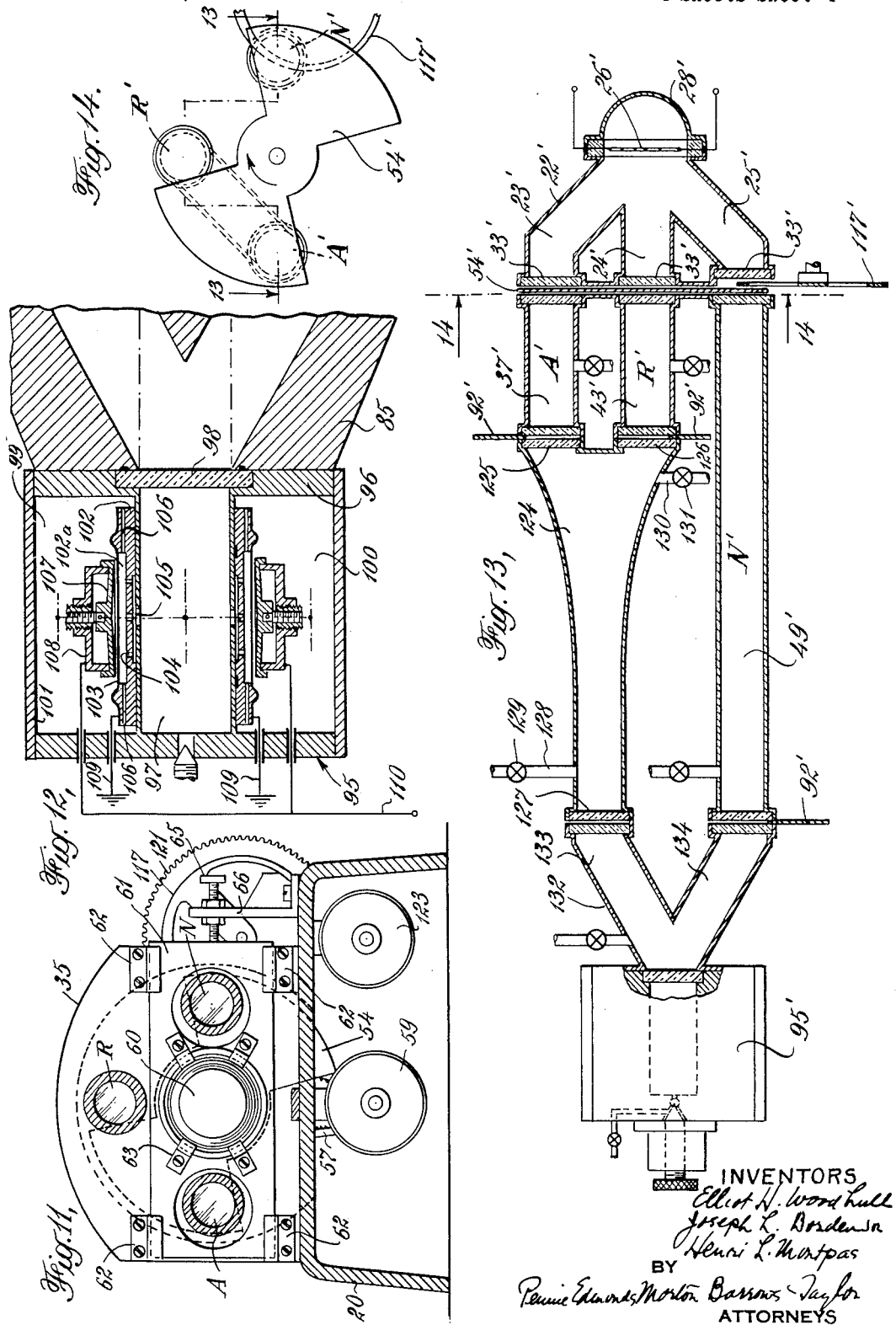
INVENTORS
Elliot H. Woodhull
Joseph L. Borden Jr
Henri L. Montpas
BY
Pennie Edmonds Morton Barrows Taylor
ATTORNEYS

United States Patent Office 2,754,424
Patented July 10, 1956

2,754,424

NON-DISPERSION ANALYZERS

Elliot H. Woodhull, Norwalk, Joseph L. Borden, Jr., Westport, and Henri L. Montpas, Norwalk, Conn., assignors to The Perkin-Elmer Corporation, Norwalk, Conn., a corporation of New York Application January 30, 1953, Serial No. 334,143

16 Claims. (Cl. 250—43.5)

This invention relates to the analysis of mixtures by the passage of radiation therethrough for the purpose of determining the amount of a component, referred to as the component "of interest," present in a mixture with at least one other component, referred to as the "interfering" component, having radiation absorption bands overlapping those of the component of interest. More particularly, the invention is concerned with a novel analyzer, which embodies the invention disclosed in U. S. Patent 2,688,089 issued to Williams August 31, 1954, and is in numerous respects an improvement on the instrument disclosed in that patent. Certain features of the present invention are disclosed but not claimed in U. S. Patent No. 2,688,090 issued to Woodhull and Tisdale August 31, 1954, for which one of the present coinventors is one of the co-applicants. The detector of the instrument herein disclosed is the invention of the co-applicant Woodhull and is disclosed and claimed in his co-pending application Serial No. 334,144, filed January 30, 1953.

The instrument of the Williams patent makes use of two beams for reference and analysis purposes, respectively, and, as a result, unequal energies are transmitted to the detector by the two beams as an inherent characteristic of the instrument. In order to avoid the production of a zero signal because of the unbalanced energies acting upon the detector, the instrument utilizes a third beam of radiation falling upon the detector coincidentally with the weaker of the first two beams and so regulated in intensity as to null the detector, when the instrument is set up for operation with the sample cell empty.

The instrument of the invention employs three beams of radiation, as disclosed in the Williams patent, and includes a number of novel features, which facilitate its construction and operation. The new instrument may make use of radiation of different kinds, but, since it is particularly adapted for infrared use, a form of the instrument, in which such radiation is utilized, will be illustrated and described in detail.

For a better understanding of the invention, reference may be made to the accompanying drawings, in which:

Fig. 1 is a top plan view with parts broken away of one form of the instrument embodying the invention;

Fig. 2 is a vertical sectional view on the line 2—2 of Fig. 1;

Fig. 3 is a horizontal sectional view on the line 3—3 of Fig. 2;

Figs. 4 and 5 are sectional views on the lines 4—4 and 5—5, respectively, of Fig. 3;

Fig. 6 is a sectional view on an enlarged scale on the line 6—6 of Fig. 3;

Fig. 7 is a diagrammatic view illustrating the positioning of the nulling trimmer;

Fig. 8 is a perspective view showing the sample cell and its mounting;

Fig. 9 is a sectional view on the line 9—9 of Fig. 8;

Fig. 10 is a sectional view with parts broken away on the line 10—10 of Fig. 3;

Fig. 11 is a sectional view on the line 11—11 of Fig. 3;

Fig. 12 is a schematic longitudinal sectional view through the detector of the instrument;

Fig. 13 is a view partly in plan and partly in section on the line 13—13 of Fig. 14 of a modified form of the instrument; and Fig. 14 is a sectional view on the line 14—14 of Fig. 13.

The instrument illustrated in the drawings comprises a base 20, which has a flat top supported on a skirt and may be made of a suitable material, such as cast aluminum. The base has a longitudinal centering rib 21 on its top surface, by which various parts of the instrument may be readily aligned.

On top of the base near one end is mounted a housing 22, which may take the form of a metal block channeled to receive rib 21, and the housing is provided with passages 23, 24, and 25 for radiation, which extend divergently through the block from an entrance opening in the outer face of the block. The passages 23, 24, and 25 form parts, respectively, of an analysis path A, a reference path R, and a nulling path N, and the axes of passages 23, 25 lie in a horizontal plane, while passage 24 is inclined upwardly in a central vertical plane between passages 23 and 25.

The radiation traveling through passages 23, 24, 25 is emitted by a source, which may be any of the usual sources of the radiation to be used. In the instrument illustrated, in which the radiation is infrared, the source is a heated spiral filament 26 made of a suitable metal, such as Nichrome. The filament lies within a cavity 27 in a metal housing 28, which is secured to block 22 by bolts 29 with the opening into the cavity registering with the entrance opening in the block. The face of the housing engaging the end of the block is formed with a channel encircling cavity 27, and a ring 30 of insulating material is mounted in the channel. The ring may be made of various materials but is preferably formed of a kind of soap-stone, which has the characteristic that, as obtained, it is readily machineable but, upon being heated to the proper temperature, becomes extremely hard. Before insertion in the cavity, the ring 30 is given the desired shape and is drilled to provide a number of radial passages, in which are mounted wires 31, which are held in place within the passages by a suitable cement. The inner ends of the wires 31 are bent to engage convolutions of the filament 26 and provide supports therefor. Leads 32 extend from the end of the filament through radial passages formed in ring 30 and out through an opening in the wall of housing 28. The inner wall of the cavity 27 is preferably of spherical configuration and the surface is highly polished for good reflection.

The ends of passages 23, 24, 25 remote from the housing 28 are closed by windows 33 lying at the corners of an isosceles triangle having its base horizontal. The windows 33 are secured in place against the inner face of block 22 and lie within openings in a plate 34 of heat insulating material held against the inner face of block 22 by a plate 35 secured to the block by screws 35a passed through openings in the block and plate 34 and threaded into plate 35. The plate 35 is provided with a number of openings and a similar plate 36 is mounted on the base at a distance inward from plate 35 and has openings aligned with certain of those in plate 35. The plates 34, 35, and 36 are channeled to receive rib 21.

A sensitizing cell 37 in the analysis path A (Fig. 3) is mounted in openings in plates 35, 36 in alignment with the end of passage 23 in housing 22, and cell 37 comprises a metal tube 38 closed at opposite ends by windows 39, 40. The cell has a gas inlet 41 provided with a valve 42.

A compensating cell 43 in the reference path R (Fig. 2) is mounted in openings in plates 35, 36 in position to receive radiation traveling through passage 24, and the cell 43 comprises a metal tube 44 closed at opposite ends by windows 45, 46. The compensating cell is provided with a gas inlet 47 containing a valve 48.

A cell 49 in the nulling path N (Fig. 3) lies in alignment with the inner end of passage 25 through housing 22 and one end of the cell is supported in an opening in plate 35. Cell 49 comprises a metal tube closed at opposite ends by windows 50, 51 and the cell is provided with a gas inlet 52 having a valve 53.

The windows 39, 45, and 50 at the outer ends of cells 37, 42, and 49, respectively, are separated from windows 33 at the inner ends of passages 23, 24, 25 to provide a space for a chopping disc 54. The disc may be opaque to the radiation and made of metal, or it may be made of a material transmitting radiation of certain wavelengths. The disc has the form of a pair of quadrants separated by similar cutouts, and it is mounted on a shaft 55 (Fig. 2) and carries a sprocket wheel 56 driven through a toothed belt 57 by a pinion 58 on the shaft of a motor 59 secured to the undersurface of the base within the skirt. The shaft 55 may be mounted in conventional bearings, but is illustrated as being the shaft of a generator 60 producing a signal utilized in a phase-sensitive rectifier, to which the amplified signal produced by the detector of the instrument is supplied, as disclosed in the patent of Woodhull and Tisdale above identified.

Generator 60 is mounted on a slide 61 (Figs. 2, 4), which is movable horizontally on the base between guides 62 attached to plate 35 and the generator is held in place on the slide by clips 63 (Fig. 11) attached to the slide and engaging a rib 64 encircling the casing of the generator. The axis of shaft 55 of the generator lies in a horizontal plane through the axes of the sensitizing cell 37 in the analysis path and cell 49 in the nulling path and the slide may be moved horizontally by an adjusting screw 65 (Fig. 11) mounted in a bracket 66 rigidly attached to the base.

In the operation of the instrument, the chopping disc 54 alternately cuts off or filters the radiation traveling along the three paths and then passes such radiation, the analysis and nulling beams being chopped in unison and the reference beam being chopped out of phase with the other two. The phase relationship between the chopping of the analysis and nulling beams and the chopping of the reference beam can be regulated by shifting the axis of rotation of the chopping disc 54 transversely in its horizontal plane, as will be apparent from Fig. 5. Movement of the axis of disc 54 horizontally varies the timing of the chopping of the reference beam R but does not change the timing of the chopping of the analysis beam A or the nulling beam N. The horizontal movement of disc 54 can be effected by shifting the slide 61 by the screw 65 in bracket 66 on the base.

The end of cell 49 closed by window 51 is supported in an opening in a plate 67 rigidly attached to the base, and, between the planes of the opposed faces of plates 36 and 67, a pair of plates 68, 69 (Figs. 4, 8) are pivotally mounted at their lower ends on plate 36 and on a bracket 67a attached to the base. Each of the plates 68, 69 has a foot 70 resting on top of the base and a channel to receive rib 21, and each foot 70 is provided with a handle 71, by which the plates can be swung to the dotted line position shown in Fig. 4. A two-part sample cell 72 is mounted in openings in plates 68, 69 with one part of the cell lying in the analysis path A and the other in the reference path R. Each part of the cell 72 comprises a metal tube 73 closed at one end by a window 74 and at the other by a window 75. The part of the cell in the reference path is provided with a gas inlet 76 containing a valve 77 and the part of the cell in the analysis path has a gas outlet 78 provided with a valve 79. The inlet and outlet lie near one end of the sample cell and, at the opposite end, the two parts of the cell are connected by a connection 80. The inlet, outlet, and connection are removable, so that the two parts of the cell may be slid endwise from plates 68, 69.

The windows used at the ends of the cells and elsewhere in the instrument may be held in place in any suitable way, as by cementing, but it is desirable that the windows closing the ends of the two parts of the sample cell be removable, so that the interior of the cell can be cleaned from time to time. For this purpose, the sample cell windows are held in place as illustrated in Fig. 9 in connection with window 75. As shown, the end of tube 73 closed by window 75 is cut away internally and externally to form a neck 81, which is externally threaded. The internal diameter of the neck is somewhat greater than the diameter of window 75 and, at the base of the neck, tube 73 is provided with an internal shoulder, on which is seated a flat gasket 82. The gasket is made of a material impervious to gases and vapors and resistant to corrosion, a typical example of a material suitable for the purpose being the tetrafluoroethylene polymer sold commercially under the name "Teflon." A collar 83 with an internal flange 83a is threaded on neck 81 and the flange 83a has an internal diameter less than the diameter of the window and is undercut to form a seat for a gasket 84 made of the same material as gasket 82. Gasket 84 bears on the outer face of the window and, when the collar 83 is threaded in place on neck 81, the window is held firmly in position between gaskets 82, 84 and is free to expand without contact with the inner surface of collar 81. By swinging the plates 68, 69 to the dotted line position shown in Fig. 4, the two parts of the sample cell are removed from the analysis and reference paths and, by unscrewing collars 83, the windows may be removed from the ends of the tubes 73 of the cell, so that the interior of the tubes can be cleaned.

Radiation issuing from the sample cell 72 and cell 49 enters passages in a housing 85 mounted on the base against the outer side of plate 67 and lying close to the end of the sample cell, the housing being channeled to fit over rib 21. The housing may take the form of a block of metal similar to the block, of which housing 22 is made, and housing 85 is provided with three passages 86, 87, and 88 converging to an outlet opening in the outer face of the block. The inner ends of the passages are closed by windows 89 (Fig. 3) and the inner end of passage 86 is aligned with the end of the part of sample cell 72 lying in the analysis path A, while the inner end of passage 87 is aligned with the end of the other part of the sample cell in the reference path R. The inner end of passage 88 is aligned with cell 49 in the nulling path N. The housing 85 may serve as a filter cell, as hereafter explained, and, for this purpose, it is provided with an inlet 90 leading into passages 86, 87, and 88 and having a valve 91.

The windows 89 in housing 85 are separated from the ends of cell 49 and of the two parts of the sample cell, and the inner face of the housing is cut away to provide space for trimmers (Fig. 4), by which the amount of radiation traveling along the analysis, reference, and nulling paths can be regulated. Each such trimmer comprises a plate 92 attached to adjusting screw 93 extending through a bracket 94 attached to housing 85. The screw carries nuts 94 above and below the bracket, so that the plate 92 can be raised and lowered and then locked in position. Each plate 92 has a concave lower end of a radius of curvature equal to the inner radius of the path, in which the trimmer is mounted.

The radiation issuing from passages 86, 87, and 88 through housing 85 enters a housing 95 (Fig. 12) containing elements of a detector. Detectors of various kinds appropriate for the radiation employed in the instrument may be used, and that illustrated is the invention of Woodhull and is disclosed and claimed in his co-pending application above identified.

The housing 95 of the Woodhull detector is made of a metal block 96, which is secured to the outer face of housing 85 and is formed to provide a central chamber 97 aligned with the outlet opening in housing 85 and closed at the outlet opening by a window 98. A pair of outer chambers 99, 100 are formed in the block on opposite sides of chamber 97 and are closed by plates 101. The chambers 97, 99, 100 may be formed by boring the block, in which case the chambers are circular in section.

Each of the chambers 99 and 100 contains an electrical condenser having a fixed plate and a movable plate and, as the condensers are alike, only the condenser within chamber 99 will be described. The condenser comprises a circular plate 102 secured against the wall of the central chamber 97 and having a peripheral flange defining a concavity 102a in its outer face. A thin flexible metallic membrane 103 is secured against the face of the flange to cover the concavity and the diaphragm forms the movable plate of the condenser. The concavity is connected through openings 104 in plate 102 and an opening 105 in the wall of chamber 97 to the interior of the chamber. The concavity is also connected by capillary ducts 106 through the flange on plate 102 to the interior of the chamber, within which the plate is mounted. The fixed element of the condenser comprises a circular metallic plate 107 mounted on an abutment member 108 supported within chamber 99 in any suitable manner, facing membrane 103 and being insulated therefrom.

The membranes 103 of the condensers in chambers 99 and 100 are connected together, preferably by being grounded as indicated at 109, and the fixed plates 107 of the condensers are connected together by line 110, as disclosed in the Woodhull and Tisdale patent above identified.

The chambers 97, 99, and 100 of the detector are connected by a passage 111, which can be shut by a valve 112 to cut off the chambers from one another. A passage 113 leads to the interior of the valve 112 and a gaseous filling for the chambers may be supplied through the passage 113 by a line 114 containing a valve 115. If desired, the outer chambers 99 and 100 may be connected through a passage 116 of substantial cross-section.

In the instrument, the amount of energy transmitted along the nulling path N is adjusted by means of a trimmer (Fig. 6), which comprises a flat metal annulus 117 having a radial arm 118 fast on the shaft 119 extending through the annulus and supported for rotation in bearings on a bracket 120 attached to the top of the base. The annulus is of much greater diameter than the window 33 at the end of the nulling passage 25 in block 22 and the window 50 at the adjacent end of cell 49, and the shaft 119 is so mounted that part of the annulus lies between the windows 33, 50 and in the path of the nulling beam. The annular strip varies in width from a minimum to a maximum and its lateral edges are symmetrical with respect to a circle C, which is concentric with the axis of shaft 119. The shaft carries a gear 121 driven by a pinion 122 on the shaft of a motor 123 attached to the bottom of the base within the skirt and the motor may be driven in response to the output of the detector, as disclosed in the Woodhull and Tisdale patent.

In order that the portion of the annulus 117 effective at any time to intercept radiation traveling along the nulling path may lie approximately centrally with respect to the nulling beam, the annulus is disposed as indicated diagrammatically in Fig. 7. In that figure, the line D is a diameter of the nulling beam issuing through window 33 and lies at right angles to a line L passing through the center of the beam and the axis of rotation of shaft 119. The line Ca is the arc of a circle of the same diameter as circle C and intersects diameter D at its ends. The trimming annulus is then so disposed in relation to the beam issuing through window 33, that the circle C on the annulus intersects line L between the intersections of that line with diameter D and with circle Ca. Circle C thus intersects diameter D near the ends thereof. In order that the annulus may be accurately positioned to produce the desired effect, bracket 120 is attached to the base by slot and bolt connections, so that it can be shifted in a direction transverse to shaft 119.

The surfaces defining the radiation path in the instrument are highly polished for multiple reflections and should be maintained in such condition for proper functioning of the instrument. As the sample may contain constituents which attack or cause discoloration of the inner surfaces of the sample cell, this cell must be cleaned from time to time. When the sample has such characteristics, the use of the two-part sample cell 72 may lead to inaccuracies in measurement because of differences in reflection from the inner surface of the two parts of the cell, and, under such conditions, it is desirable to employ the instrument of modified construction shown diagrammatically in Figs. 13 and 14.

The modified instrument includes a housing 22′ containing passages 23′, 24′, and 25′ for radiation emitted by source 26′ in housing 28′. Passages 23′, 24′, and 25′ form parts, respectively, of an analysis path A′, a reference path R′, and a nulling path N′, and the passages are closed at their ends remote from the source by windows 33′. A sensitizing cell 37′, which is similar to cell 37, and a compensating cell 43′, which is similar to cell 43, lie in the analysis and reference paths, respectively, beyond the windows 33′. A sample cell 124 lies beyond cells 37′ and 43′ and the sample cell is of funnel-shape and provided at one end with windows 125, 126 lying in line, respectively, with the adjacent windows at the ends of cells 37′ and 43′. At its other end, the cell 124 has a single opening closed by a window 127. The sample cell is provided at one end with an inlet 128 having a valve 129 and at the other end with an outlet 130 having a valve 131. A housing 132 lies beyond the end of the sample cell and is formed by two converging passages 133, 134 closed by windows. Sample cell 124 directs radiation into passage 133 through window 127 and the radiation traveling along the nulling path from passage 25′ in housing 22′ travels through a cell 49′ similar to cell 49 and enters the passage 134. A detector 95′, which is similar to detector 95, is mounted at the outer end of housing 132 to receive radiation traveling through passages 133, 134.

In the modified form of the instrument, the radiation traveling along the analysis path A′ and the nulling path N′ is chopped simultaneously and out of phase with the radiation traveling along the reference path R′ by means of a chopper 54′, which is similar to chopper 54 and driven by similar means. The instrument is provided with manually operated trimmers 92′, which are similar to trimmers 92 except for their location. Trimmers 92′ in the analysis and reference paths are mounted between sample cell 124 and the sensitizing cell 37′ and the compensating cell 43′, respectively. Trimmer 92′ in the nulling path is mounted between cell 49′ and the adjacent end of housing 132. The instrument is provided with a trimmer 117′ for adjusting the amount of radiation in the nulling beam.

In the modified form of the instrument, the sample cell 124 consists of a single part which lies in both analysis and reference paths. As a consequence, the radiation absorbed from the analysis and reference beams, because of the discoloration of the inner walls of the sample cell, is the same.

In setting up the instrument shown in Fig. 1 for the infrared analysis of a mixture containing the gas of interest and an interfering component, the three chambers 97, 99, and 100 within the housing 95 contain the gas of interest in a concentration, which gives maximum detector sensitivity. The cell 49 is filled with a non-interfering gas and preferably one, which is infrared non-absorbing, after which the nulling path N is blanked off by its trimmer 92. The passages within the housing 85 are either evacuated or filled with a non-absorbing gas through connection 90 and the connection is closed by valve 91. The cells 37 and 43 and the sample cell 72 are either evacuated or filled with a non-absorbing gas, as preferred. The source 26 and chopper 54 are started in operation and radiation transmitted along the analysis and reference paths alternately enters the detector. Such radiation causes outward movement of the membranes 103 and corresponding changes in the capacity of the condensers. The detector, accordingly, produces information in the form of capacity changes, which can be converted into electrical signals by appropriate means. In the preliminary adjustment of the instrument, the manual trimmer 92 in the reference path R is adjusted until the signal produced by the use of the information supplied by the detector is reduced to zero, after which the trimmer is locked in position. The analysis path A and the reference path R now transmit equal amounts of energy from the source to the detector.

The sensitizing cell 37 in the analysis path is next filled with the gas of interest, preferably to atmospheric pressure. This removes from the analysis path a large percentage of the radiation in wavelength regions where the detector absorbs. Under these conditions, a radiation energy unbalance exists between the analysis path and the reference path and will be indicated at the detector 95. When the gas of interest is flowed through the sample cell 72, the unbalance will decrease since the sample removes more energy from the reference path than from the analysis path. Thereafter, the compensator cell 43 in the reference path is filled with an appropriate mixture of the interfering gases. A background component will interfere if it has absorption regions common to those of the gas of interest and therefore will produce a false signal proportional to the degree of spectral overlap. If, however, this background gas is placed in the compensator cell 43 in the proper proportion and concentration, it is possible to reduce the false signal substantially to zero. The partial pressure of the interfering component is determined by trial and is such that the instrument does not respond appreciably to changes in the concentration of the interfering component present in the mixture to be analyzed. After the instrument has thus been sensitized and compensated, the trimmer 117 in the nulling path is adjusted to place a given point, such as mid-scale, in the nulling path. A known sample, which may be the average composition of the mixture to be analyzed is introduced into the sample cell 72. The manual trimmer 92 is then adjusted so as to allow radiation to pass through the nulling path in an amount equal to the difference between the respective amounts of radiation passed by the analysis path and the reference path. Under these conditions, the sum of the radiation passed by the analysis path and the nulling path is equal to the radiation passed by the reference path and the detector 95 will accordingly produce a zero signal.

The known sample is then removed and when a sample of unknown mixture is introduced into sample cell 72, any difference in the amount of the gas of interest in the unknown mixture from the amount the gas of interest in the standard sample causes the detector to produce a proportionate output signal. The signal thus produced not only has an amplitude which is indicative of the magnitude of the difference in concentration of the gas of interest as between the unknown mixture and the standard sample, but because of the chopping action of the apparatus, an alternating signal is produced whose phase is correlated to the sense of the detected difference. This signal can be reduced to zero by adjustment of the trimmer 117 in the nulling path to increase or decrease the intensity of the nulling beam. The amount of such adjustment necessary to effect a null is a measure of the magnitude of the difference between the amount of the gas of interest in the unknown mixture and the amount of that gas in the sample. The sense or direction of such adjustment is indicative of whether the amount of the gas of interest in the unknown is greater or lesser than the amount of the gas of interest in the sample, as is described more fully in the Woodhull and Tisdale patent above-identified.

In some cases, in which compensation of the instrument by introduction of the interfering component into the compensating cell 43 cannot be exactly achieved, some of the interfering component may be introduced into the passages in housing 85 to act as a filter. The presence of the filter gas in the housing reduces the radiation intensity in the region, where there is an overlapping absorption by the gas of interest and the interfering component, and the presence of the filter gas thus reduces the unwanted signal. When such filtering is required, the filter gas is introduced into housing 85 before the instrument is compensated.

We claim:

1. In an analyzer, the combination of a source of radiation, a detector receiving radiation from the source and responding thereto, means defining three paths for beams of radiation traveling from the source to the detector, the paths having divergent portions starting at the source and convergent portions terminating at the detector, and means for interrupting the beams periodically with at least two of the beams being interrupted simultaneously.

2. In an analyzer, the combination of a source of radiation, a detector receiving radiation from the source and responding thereto, means defining three paths for beams of radiation traveling from the source to the detector, the paths having divergent portions starting at the source and convergent portions terminating at the detector, and means for interrupting the beams periodically with two of the beams being interrupted simultaneously and out of phase with the other beam.

3. In an analyzer, the combination of a source of radiation, a detector receiving radiation from the source and responding thereto, means defining three paths for beams of radiation traveling from the source to the detector, the paths having divergent portions starting at the source and convergent portions terminating at the detector, means for interrupting the beams periodically with at least two of the beams being interrupted simultaneously, and means for varying the intensity of one of said two beams.

4. In an analyzer, the combination of a source of radiation, a detector sensitive to radiation from the source, means defining three paths for beams of radiation from the source to the detector, and means for periodically interrupting the beams traveling along the second and third paths simultaneously and out of phase with the interruption of the beam traveling along the first path, said interrupting means including a rotary chopping disc and the axes of the second and third paths at the plane of the disc lying on a line through and on opposite sides of the axis of rotation of the disc.

5. In an analyzer, the combination of a source of radiation, a detector sensitive to radiation from the source, means defining three paths for beams of radiation from the source to the detector, means for periodically interrupting the beams traveling along the second and third paths simultaneously and out of phase with the interruption of the beam traveling along the first path, said interrupting means including a rotary chopping disc and the axes of the second and third paths at the plane of the disc lying on a line through and on opposite sides of the axis of rotation of the disc, and a support for the disc, said support being movable to shift the axis of rotation of the disc along said line.

6. In an analyzer, the combination of a source of radiation, a detector receiving radiation from the source and responding thereto, means defining three paths for beams of radiation traveling from the source to the detector, the paths having portions, of which those in the second and third path lie with their axes in a plane and that in the first path lies with its axis at one side of the plane, and means for periodically interrupting the beams, said means interrupting the beams traveling along the second and third paths simultaneously and out of phase with the interruption of the beam traveling along the first path and said interrupting means including a chopping disc rotating on an axis in said plane and between the axes of the parallel portions of the second and third paths.

7. In an analyzer, the combination of a source of radiation, a detector receiving radiation from the source and responding thereto, means defining three paths for beams of radiation traveling from the source to the detector, the paths having parallel portions, of which those in the second and third path lie with their axes in a plane and that in the first path lies with its axis at one side of the plane, a chopping disc for interrupting the beams, said disc having diametrical solid quadrants separated by cut-outs, means for supporting the disc for rotation on an axis in said plane and between and parallel to the axes of the parallel portions of the second and third paths, and means for moving the supporting means to shift the position of the axis of rotation of the disc in said plane.

8. In an analyzer, the combination of a source of radiation, a detector for receiving radiation from the source and responding thereto, means for defining a reference path, an analysis path, and a nulling path for beams of radiation traveling from the source to the detector, said path-defining means including a sample cell lying in both the reference path and the analysis path, a mounting for the sample cell movable to remove the cell from the reference and analysis paths, and means for periodically interrupting the beams, said means interrupting in unison the beams in the analysis and nulling paths.

9. In an analyzer, the combination of a source of radiation, a detector for receiving radiation from the source and responding thereto, means for defining a reference path, an analysis path, and a nulling path for beams of radiation traveling from the source to the detector, said path-defining means including a compensator cell in the reference path adjacent the detector, a sensitizer cell in the analysis path adjacent the source, a sample cell remote from the source in both the reference and analysis paths, and means for periodically interrupting the beams in said paths.

10. In an analyzer, the combination of a source of radiation, a detector for receiving radiation from the source and responding thereto, means for defining a reference path, an analysis path, and a nulling path for beams of radiation traveling from the source to the detector, said paths having parallel portions with the axes of said portions in the analysis and nulling paths lying in a plane and the axis of said portion of the reference path lying out of said plane and equidistant from said first two axes, said path-defining means including a compensator cell in the reference path, a sensitizer cell in the analysis path, and a sample cell in both the reference and analysis paths, and means for periodically interrupting the beams in the parallel portions of said paths, said means interrupting the beams in the analysis and nulling paths in unison.

11. In an analyzer, the combination of a source of radiation, a detector for receiving radiation from the source and responding thereto, means for defining a reference path, an analysis path, and a nulling path for beams of radiation traveling from the source to the detector, said paths having parallel portions with the axes of said portions in the analysis and nulling paths lying in a plane and the axis of said portion of the reference path lying out of said plane and equidistant from said first two axes, said path-defining means including a compensator cell in the reference path, a sensitizer cell in the analysis path, a filter cell in all three paths, and a sample cell in both the reference and analysis paths, and means for periodically interrupting the beams, said means interrupting the beams in the analysis and nulling paths in unison.

12. In an analyzer, the combination of a source of radiation, a detector sensitive to radiation, means providing three divergent passages for radiation traveling from the source, means providing two convergent passages for radiation approaching the detector, means cooperating with the passage-providing means for defining a path for a reference beam of radiation, a path for an analysis beam of radiation, and a path for a nulling beam of radiation, said path-defining means including a compensating cell in the reference path and leading from the outer end of the first divergent passage, a sensitizing cell in the analysis path and leading from the outer end of the second divergent passage, a sample cell in both the reference and analysis paths leading from the outer ends of the compensating and sensitizing cells to the first convergent passage, and a cell for non-absorbing material in the third path and leading from the outer end of the third divergent passage to the second convergent passage, and means for periodically interrupting the three beams, the analysis and nulling beams being interrupted in unison and out of phase with the reference beam and the reference and analysis beams being interrupted between the source and the sample cell.

13. An analyzer, which comprises a block having an entrance opening in its outer face and a plurality of divergent passages leading from the opening to the inner face of the block, a source of radiation mounted on the block to emit radiation entering the entrance opening and traveling through the passages, a second block spaced from the first and having an exit opening in its outer face and a plurality of convergent passages leading from the inner face to the exit opening, a detector mounted on the second block in position to receive radiation traveling through the convergent passages and issuing through the exit opening, cell means between the blocks cooperating with the passages therein to define three paths for beams of radiation, said cell means confining a sample to be examined in the the first two paths, and means for periodically interrupting the beams, the beams traveling along the second and third paths being interrupted simultaneously 14. In an analyzer, the combination of means defining a path of circular cross-section for a beam of radiation and means for varying the intensity of the beam comprising a flat annulus of substantially greater diameter than the path and varying in width from a minimum to a maximum, the maximum width being substantially less than the diameter of the path, and a mounting supporting the annulus for rotation in a plane transverse to the path and with a portion of the annulus continuously in the path, the annulus being symmetrical relative to a circle concentric with the annulus and the annulus being so disposed in relation to the path that said circle intersects a diameter of the path close to the ends of said diameter.

15. In radiation apparatus, a source of infrared radiation which comprises a metallic housing having a cavity with an entrance opening in a surface of the housing, the surface being formed with a channel encircling the opening, a ring of ceramic material seated in the channel to surround the opening, a plurality of supporting elements embedded in the ring and extending radially into the open center thereof, and an electrically conducting filament of spiral form mounted within the ring by its convolutions engaged by the elements.

16. In radiation apparatus, a source of infrared radiation which comprises a metallic housing having a cavity with an entrance opening in a surface of the housing, the surface being formed with a channel encircling the opening, a ring of ceramic material seated in the channel to surround the opening, a plurality of supporting elements embedded in the ring and extending radially into the open center thereof, an electrically conducting filament of spiral form mounted within the ring by its convolutions engaged by the elements, two of the elements being connected to the ends of the filament to serve as leads, and an opening in the wall of the housing extending from the channel for passage of the leads.

References Cited in the file of this patent

UNITED STATES PATENTS

| | | |
|---|---|---|
| 2,395,489 | Major et al. | Feb. 26, 1946 |
| 2,545,162 | Muly et al. | Mar. 13, 1951 |
| 2,648,775 | Waters | Aug. 11, 1953 |